United States Patent
Choi et al.

(10) Patent No.: US 10,798,272 B2
(45) Date of Patent: Oct. 6, 2020

(54) ARTILLERY SHELL-SHAPED INFORMATION GATHERING DEVICE

(71) Applicant: HANWHA DEFENSE CO., LTD., Changwon-si (KR)

(72) Inventors: Dong Hwan Choi, Changwon-si (KR); Seong Jun Cheon, Changwon-si (KR); Yong Joon Chang, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 61 days.

(21) Appl. No.: 15/773,305

(22) PCT Filed: Jun. 27, 2016

(86) PCT No.: PCT/KR2016/006812
§ 371 (c)(1),
(2) Date: May 3, 2018

(87) PCT Pub. No.: WO2017/090859
PCT Pub. Date: Jun. 1, 2017

(65) Prior Publication Data
US 2018/0324333 A1 Nov. 8, 2018

(30) Foreign Application Priority Data
Nov. 23, 2015 (KR) .................. 10-2015-0163986

(51) Int. Cl.
*H04N 5/225* (2006.01)
*F41H 13/00* (2006.01)
(Continued)

(52) U.S. Cl.
CPC .......... *H04N 5/2252* (2013.01); *F41H 13/00* (2013.01); *F42B 12/36* (2013.01); *F42B 12/365* (2013.01);
(Continued)

(58) Field of Classification Search
CPC .. H04N 5/2252; H04N 5/2257; F42B 12/365; F42B 12/36; F42B 12/46; F42B 15/08; F42B 15/01; F42B 35/00
(Continued)

(56) References Cited

U.S. PATENT DOCUMENTS 3,690,393 A * 9/1972 Guy .................. A63H 18/10
180/65.6
3,962,537 A * 6/1976 Kearns ................. F41G 3/14
348/144
(Continued)

FOREIGN PATENT DOCUMENTS

JP 6-72755 B2 9/1994
JP 2008170094 A 7/2008
(Continued)

OTHER PUBLICATIONS

Written Opinion (PCT/ISA/237) issued by the International Searching Authority in corresponding International Application No. PCT/KR2016/006812, dated Sep. 12, 2016.
(Continued)

*Primary Examiner* — Joshua E Freeman
*Assistant Examiner* — Bridget A Cochran
(74) *Attorney, Agent, or Firm* — Sughrue Mion, PLLC (57) ABSTRACT

Provided is a shell-type monitoring apparatus. The shell-type monitoring apparatus includes a body, a gas storage provided in the body and configured to store a gas, a variable volume portion provided on the gas storage in the body and having a volume that varies depending on an amount of gas supplied from the gas storage, a photographing unit provided on the body and configured to move in the body, and a moving flow path provided in the body and configured to supply the gas in the variable volume portion to the photographing unit and thereby move the photographing unit.

15 Claims, 4 Drawing Sheets

(51) Int. Cl.
*F42B 15/08* (2006.01)
*F42B 12/36* (2006.01)
*F42B 12/46* (2006.01)

(52) U.S. Cl.
CPC .............. *F42B 12/46* (2013.01); *F42B 15/08* (2013.01); *H04N 5/2257* (2013.01)

(58) Field of Classification Search
USPC .......................................... 102/473; 244/3.16
See application file for complete search history.

(56) References Cited

U.S. PATENT DOCUMENTS

| | | | | |
|---|---|---|---|---|
| 4,267,562 A * | 5/1981 | Raimondi | .................. | F41G 3/02 348/144 |
| 4,962,689 A * | 10/1990 | Phan | .................. | F41A 1/08 89/1.703 |
| 5,711,227 A * | 1/1998 | Johnson | .................. | E01B 23/00 104/126 |
| 6,034,716 A * | 3/2000 | Whiting | .................. | H04N 5/2259 348/36 |
| 6,056,237 A * | 5/2000 | Woodland | .................. | B64C 3/40 244/3.15 |
| 6,119,976 A * | 9/2000 | Rogers | .................. | B64C 39/024 244/13 |
| 6,125,955 A * | 10/2000 | Zoretich | .................. | B60B 19/006 152/44 |
| 6,260,797 B1 * | 7/2001 | Palmer | .................. | B64C 39/024 102/501 |
| 6,373,521 B1 * | 4/2002 | Carter | .................. | G07C 5/0891 244/17.15 |
| 6,453,790 B1 * | 9/2002 | Cesulka | .................. | F42B 12/04 102/293 |
| 6,510,776 B2 | 1/2003 | Sirmalis | .................. | F41G 3/142 244/3.12 |
| 6,924,838 B1 * | 8/2005 | Nieves | .................. | H04N 5/2251 348/143 |
| 6,978,717 B1 * | 12/2005 | Hambric | .................. | F42B 12/365 102/473 |
| 6,995,787 B2 * | 2/2006 | Adams | .................. | H04N 7/183 348/157 |
| 7,210,654 B1 * | 5/2007 | Cox | .................. | B64C 39/024 244/190 |
| 7,400,357 B2 * | 7/2008 | Hambric | .................. | H04N 7/188 348/143 |
| 7,437,985 B2 * | 10/2008 | Gal | .................. | F42B 12/362 102/502 |
| 7,679,037 B2 * | 3/2010 | Eden | .................. | F42B 12/365 244/1 R |
| 8,604,900 B2 * | 12/2013 | Kocijan | .................. | B60L 13/04 336/110 |
| 8,689,692 B2 * | 4/2014 | Brill | .................. | F42B 12/365 102/265 |
| 8,855,846 B2 * | 10/2014 | Grzywna | .................. | G01C 21/005 244/189 |
| 9,036,942 B1 * | 5/2015 | Badger | .................. | F42C 13/047 382/284 |
| 9,448,040 B2 * | 9/2016 | Rastegar | .................. | G06T 7/73 |
| 9,638,501 B2 * | 5/2017 | Parker | .................. | F42B 12/365 |
| 9,870,504 B1 * | 1/2018 | Bushmitch | .................. | G06T 5/50 |
| 2003/0011706 A1 * | 1/2003 | Chang | .................. | H04N 7/183 348/375 |
| 2003/0127009 A1 * | 7/2003 | Oron | .................. | F41G 3/02 102/213 |
| 2004/0066451 A1 * | 4/2004 | Schroth | .................. | F42B 12/365 348/144 |
| 2004/0075585 A1 * | 4/2004 | Kaiser | .................. | F41F 3/045 340/946 |
| 2004/0089186 A1 * | 5/2004 | Brygdes-Price | .................. | F42B 12/34 102/502 |
| 2004/0196367 A1 * | 10/2004 | Raymond | .................. | F42B 12/365 348/144 |
| 2005/0051667 A1 * | 3/2005 | Arlton | .................. | B64C 27/10 244/17.11 |
| 2006/0225599 A1 * | 10/2006 | Brunet | .................. | C06B 45/00 102/430 |
| 2006/0283345 A1 * | 12/2006 | Feldman | .................. | F42B 12/365 102/430 |
| 2010/0300320 A1 * | 12/2010 | McGarraugh | .................. | F42B 12/365 102/439 |
| 2011/0100201 A1 * | 5/2011 | Bass | .................. | H04B 7/18502 89/1.11 |
| 2014/0077587 A1 * | 3/2014 | Smith | .................. | B63B 59/10 305/15 |
| 2015/0128823 A1 * | 5/2015 | Akcasu | .................. | F42B 12/365 102/517 |
| 2017/0041515 A1 * | 2/2017 | Ohara | .................. | H04N 5/225 |
| 2017/0061748 A1 * | 3/2017 | Graham | .................. | G01S 1/02 |

FOREIGN PATENT DOCUMENTS

| | | | | |
|---|---|---|---|---|
| KR | 1020080006809 | * | 1/2008 | ......... G01N 21/8806 |
| KR | 1020080006809 A | | 1/2008 | |
| KR | 1020080037434 A | | 4/2008 | |
| KR | 1020100012775 A | | 2/2010 | |
| KR | 1020110092753 A | | 8/2011 | |
| KR | 1020150088642 A | | 8/2015 | |

OTHER PUBLICATIONS

International Search Report (PCT/ISA/210), issued by International Searching Authority in corresponding International Application No. PCT/KR2016/006812, dated Sep. 12, 2016.

* cited by examiner

ARTILLERY SHELL-SHAPED INFORMATION GATHERING DEVICE

This application is a National stage entry of International Application No. PCT/KR2016/006812, filed on Jun. 27, 2016, which claims priority from Korean Patent Application Nos. KR 10-2015-0163986 filed Nov. 23, 2015. The disclosures of each of the applications are herein incorporated by reference in their entirety.

TECHNICAL FIELD

The present disclosure relates to an apparatus, and more particularly, to a shell-type monitoring apparatus.

BACKGROUND ART

In general, a shell-type monitoring apparatus is mounted in a gun barrel and fired to reconnoiter. Such a shell-type monitoring apparatus may reconnoiter enemy territory or acquire information about an external environment. Here, the shell-type monitoring apparatus may be manufactured in various forms. For example, the shell-type monitoring apparatus may be designed to release a parachute and fall down after being fired. Also, the shell-type monitoring apparatus may obtain external information while moving along a launch orbit, without having an additional structure.

The above-described shell-type monitoring apparatus is disclosed in Korean Laid-open Patent No. 2015-0088642 (Title: Shell Firing system, Applicant: Hanhwa Techwin, Co., Ltd.)

DESCRIPTION OF EMBODIMENTS

Technical Problem

A shell-type monitoring apparatus may be used in various fields. For example, the shell-type monitoring apparatus may be used for military purposes to reconnoiter enemy locations. Also, the shell-type monitoring apparatus may be used to photograph topography.

Solution to Problem

One or more embodiments of the present disclosure provide a shell-type monitoring apparatus.

According to an aspect of the present disclosure, a shell-type monitoring apparatus includes: a body; a gas storage provided in the body and configured to store a gas; a variable volume portion provided on the gas storage in the body, the variable volume portion having a volume that varies depending on an amount of the gas supplied from the gas storage; a photographing unit provided in the body and configured to move in the body; and a moving flow path provided in the body and configured to supply the gas in the variable volume portion to the photographing unit to move the photographing unit.

Advantageous Effects of Disclosure

According to embodiments of the present disclosure, reconnoitering may be performed at a vast range of angles. Also, a shell-type monitoring apparatus according to embodiments of the present disclosure may be used for a long period of time, by photographing an outer portion thereof while being slowly lowered.

According to embodiments of the present disclosure, a photographing unit may be rotated by non-electrical driving power and accidents caused by a sudden fall may be prevented by slowly lowering the photographing unit.

BEST MODE

According to an aspect of the present disclosure, a shell-type monitoring apparatus includes: a body; a gas storage provided in the body and configured to store a gas; a variable volume portion provided on the gas storage in the body, the variable volume portion having a volume that varies depending on an amount of the gas supplied from the gas storage; a photographing unit provided in the body and configured to move in the body; and a moving flow path provided in the body and configured to supply the gas in the variable volume portion to the photographing unit to move the photographing unit.

Also, the shell-type monitoring apparatus may further include a guide provided in the body and configured to guide movement of the photographing unit.

Also, the photographing unit may include: a mover provided on the moving flow path and configured to move on the moving flow path according to supply of the gas; and a camera provided on the mover and configured to photograph an outside.

Also, the shell-type monitoring apparatus may further include a communicator electrically connected to the photographing unit and configured to transmit data that is photographed by the photographing unit and converted, to an outer portion or to receive an external signal.

Also, the shell-type monitoring apparatus may further include a first control unit configured to selectively block or allow supply of the gas from the gas storage to the variable volume portion.

Also, the shell-type monitoring apparatus may further include a second control unit provided on the moving flow path and configured to selectively open or close the moving flow path.

Also, the shell-type monitoring apparatus may further include a power unit electrically connected to the photographing unit.

Also, the shell-type monitoring apparatus may further include a discharge path connected to the moving flow path and configured to guide the gas in the moving flow path to an outside.

Also, the shell-type monitoring apparatus may further include a third control unit provided on the discharge path and configured to selectively open or close the discharge path.

According to an aspect of the present disclosure, a shell-type monitoring apparatus includes: a body; a photographing unit provided on the body and configured to move along an outer surface of the body; and a driver provided on at least one of the body and the photographing unit and configured to move the photographing unit.

Also, the shell-type monitoring apparatus may further include: a gas storage provided in the body and configured to store a gas; and a variable volume portion provided on the gas storage in the body, the variable volume portion having a volume that varies depending on an amount of the gas supplied from the gas storage.

Also, the shell-type monitoring apparatus may further include a gas transfer unit provided in the body and connected to the variable volume portion, the gas transfer unit configured to guide a gas in the variable volume portion to the outside.

Also, the gas transfer unit may include a discharge path connected to the variable volume portion.

Also, the gas transfer unit may further include a third control unit provided on the discharge path.

Also, the driver may include: a magnet provided on one of the body and the photographing unit; and an electromagnet provided on the other one of the body and the photographing unit and facing the magnet.

MODE OF DISCLOSURE

The present disclosure will be more clearly understood from embodiments described below in detail with reference to the accompanying drawings. However, the present disclosure is not limited to the following embodiments and may be implemented in various different forms. The embodiments are provided merely to complete the present disclosure and to provide those skilled in the art of the present disclosure with the category of the invention. The present disclosure is defined only by the claims. The terminology used herein is for the purpose of describing particular embodiments only and is not intended to be limiting of exemplary embodiments. As used herein, the singular forms "a," "an" and "the" are intended to include the plural forms as well, unless otherwise defined. It will be further understood that the terms "comprises" and/or "comprising" used herein specify the presence of stated features, steps, operations, and/or devices thereof, but do not preclude the presence or addition of one or more other features, steps, operations, and/or devices thereof. It will be understood that although the terms "first" and "second" are used herein to describe various elements, these elements should not be limited by these terms. Terms are only used to distinguish one element from other elements.

Figure 1:
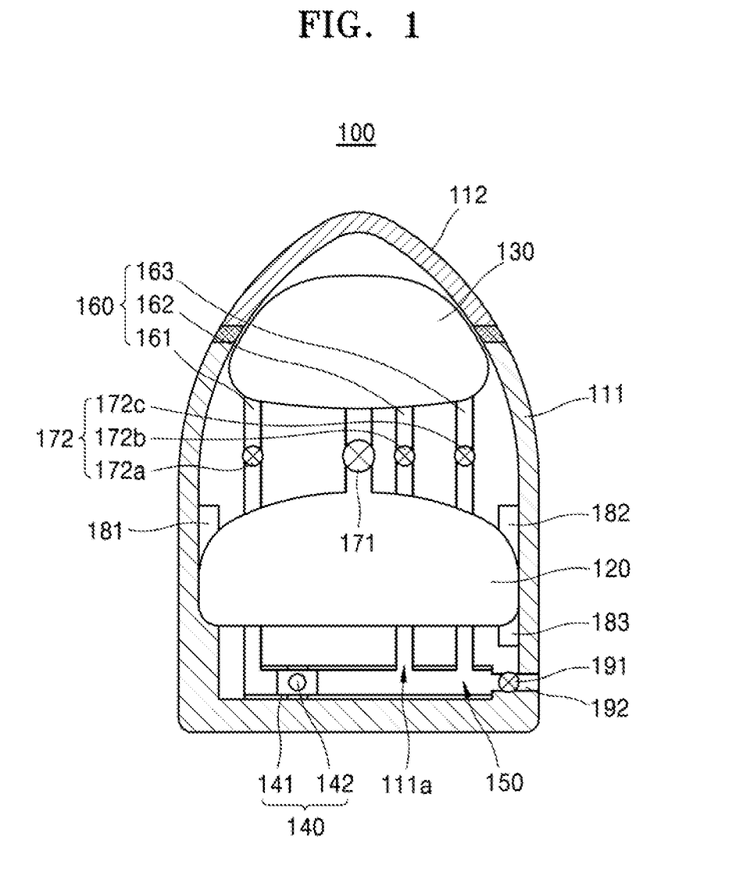
FIG. 1 is a conceptual diagram of a shell-type monitoring apparatus according to an embodiment of the present disclosure.
Figure 2:
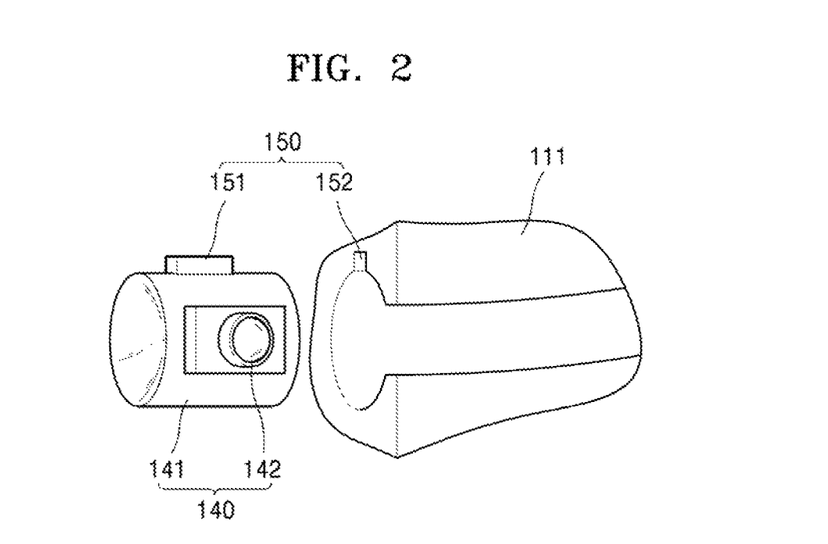
FIG. 2 is a conceptual diagram showing movement of a camera of FIG. 1.
Figure 3:
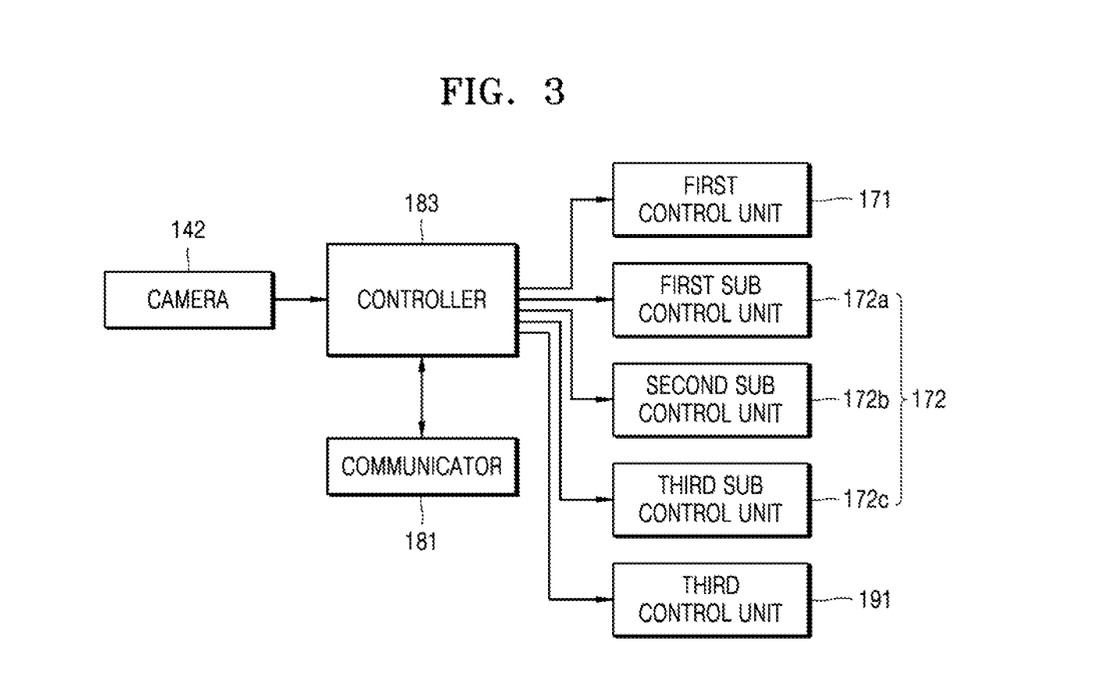
FIG. 3 is a block diagram illustrating a control flow of the shell-type monitoring apparatus of FIG. 1.

FIG. 1 is a conceptual diagram of a shell-type monitoring apparatus according to an embodiment of the present disclosure. FIG. 2 is a conceptual diagram showing movement of a camera of FIG. 1. FIG. 3 is a block diagram illustrating a control flow of the shell-type monitoring apparatus of FIG. 1.

Referring to FIGS. 1 to 3, a shell-type monitoring apparatus 100 may include a body 111, a cover 112, a gas storage 120, a variable volume portion 130, a photographing unit 140, a guide 150, a moving flow path 160, a communicator 181, a first control unit 171, a second control unit 172, a power unit 182, and a controller 183.

The body 111 may include a space therein, and may have a cylindrical shape, etc. Here, the body 111 may have a part that is open, and the cover 112 may be detachably provided at the opening part of the body 111.

The body 111 and the cover 112 may be coupled to each other to be formed as a shell. Here, a delay fuse, etc. may be arranged on a boundary between the cover 112 and the body 111. In particular, the cover 112 and the body 111 may be configured to selectively separate from each other.

The gas storage 120 may be fixed in the body 111. Here, the gas storage 120 may include a space therein, and a gas may be injected into the space in the gas storage 120. In particular, the gas may be stored in the gas storage 120 in a liquefied state.

The gas may be non-explosive. For example, the gas may be an inert gas such as helium, argon, etc.

The variable volume portion 130 may have a space therein, and when the gas is supplied thereto, a volume of the variable volume portion may vary. For example, the variable volume portion 130 may be similar to a balloon. In particular, the variable volume portion 130 may include an elastic material.

The photographing unit 140 may move through the body 111. In detail, the photographing unit 140 may move along an outer surface of the body 111. As another embodiment, the photographing unit 140 may linearly move in the body 111.

In the above case, the photographing unit 140 may be provided on the outer surface of the body 111, or may be provided to be inserted in the body 111. When the photographing unit 140 is provided in the body 111, a part in the outer surface of the body 111, through which the photographing unit 140 moves, may include a transparent material. That is, the outer surface of the body 111 may be partially formed as a transparent window. Here, the photographing unit 140 may move straightly or as a curve. In detail, the photographing unit 140 may move as a curve when the body 111 partially has a curved surface. Also, the photographing unit 140 may move straightly in the body 111. Hereinafter, a case where the photographing unit 140 straightly moves in the body 111 will be described in detail below.

When the photographing unit 140 is provided in the body 111 as described above, the body 111 may include a groove 111a or a hole (not shown), through which a part of the photographing unit 140 moves. Hereinafter, a case in which the body 111 includes the groove 111a will be described in detail below, for convenience of description. Here, a transparent window, etc. may be provided on an outer surface of the groove 111a of the body 111.

The photographing unit 140 may include a mover 141 that is installed in the body 111 to be moved, and a camera 142 connected to the mover 141. Here, the mover 141 may have a curved surface. For example, the mover 141 may be formed as a hopper.

The guide 150 may be provided in the body 111. Here, at least one of the mover 141 and the camera 142 may be provided on the guide 150 and moved. In particular, the guide 150 may guide movement of at least one of the mover 141 and the camera 142. Hereinafter, a case in which the guide 150 is connected to the mover 141 to guide the movement of the mover 141 will be described in detail below, for convenience of description.

The guide 150 as above may be provided as a rail. For example, the guide 150 may include a linear motion guide. Also, the guide 150 may include a roller provided on at least one of the mover 141 and the body 111, and a rail provided on the other of the mover 141 and the body 111 so that the roller is mounted and moved thereon. As another embodiment, the guide 150 may include a guide recess 152 formed in at least one of the mover 141 and the body 111, and a guide protrusion 151 provided on the other of the mover 141 and the body 111. Here, the guide 150 is not limited to the above example, and the guide 150 may include any type of structure and device capable of guiding the movement of the photographing unit 140 when the photographing unit 140 moves along the outer surface of the body 111. Hereinafter, a case in which the guide 150 includes the guide protrusion 151 formed on the mover 141 and the guide recess 152 formed in the body 111 will be described in detail below, for convenience of description.

The moving flow path 160 may be connected to the variable volume portion 130. Here, the moving flow path 160 may supply an expanding gas in the variable volume portion 130 to the photographing unit 140. In particular, the photographing unit 140 may move along the outer surface of the body 111 when the expanding gas is supplied.

The moving flow path 160 may include a plurality of moving flow paths. For example, the moving flow path 160 may include a first moving flow path 161 connected to the variable volume portion 130, a second moving flow path 162, and a third moving flow path 163. Here, the first moving flow path 161, the second moving flow path 162, and the third moving flow path 163 may be individually connected to the groove 111a.

The communicator 181 may receive or transmit data to or from outside. Here, the communicator 181 may receive a control signal from outside. Also, the communicator 181 may be electrically connected to the photographing unit 140 to transfer data generated by the photographing of the photographing unit 140 to outside.

The first control unit 171 is provided between the gas storage 120 and the variable volume portion 130 to selectively block the gas transferred from the gas storage 120 to the variable volume portion 130. Here, the first control unit 171 may be provided as a solenoid valve (not shown), a check valve (not shown), etc. Hereinafter, a case in which the first control unit 171 includes the solenoid valve will be described in detail below, for convenience of description.

The second control unit 172 may be provided on the moving flow path 160. Here, the second control unit 172 may be provided on each moving flow path 160. For example, the second control unit 172 may include a first sub control unit 172a in the first moving flow path 161, a second sub control unit 172b in the second moving flow path 162, and a third sub control unit 172c in the third moving flow path 163. Here, the first sub control unit 172a to the third sub control unit 172c may have a shape that is the same as or similar to the first control unit 171.

The power unit 182 may be provided in the body 111. Here, the power unit 182 may include a secondary battery that is rechargeable or a primary battery.

The controller 183 may have various shapes. For example, the controller 183 may be provided as a circuit board in the body 111. As another embodiment, the controller 183 may include a portable terminal such as a personal computer, a laptop computer, a mobile phone, a personal digital assistant (PDA), etc. that is separately installed from the shell-type monitoring apparatus 100. Hereinafter, for convenience of description, a case in which the controller 183 is formed as a circuit board and installed in the body 111, will be described in detail below.

In addition, the shell-type monitoring apparatus 100 may be fired by an external launcher. When the shell-type monitoring apparatus 100 is fired, the shell-type monitoring apparatus 100 may move as a curve.

In the shell-type monitoring apparatus 100 that flies a predetermined time as described above, the cover 112 is detached from the body 111 and the first control unit 171 operates to supply the gas from the gas storage 120 to the variable volume portion 130. Here, the gas storage 120 includes liquefied gas or is in a high-pressure state, and thus, the gas storage 120 may transfer the gas to the variable volume portion 130.

When the gas is supplied to the variable volume portion 130, the volume of the variable volume portion 130 increases to make the body 111 stay at a predetermined height.

In addition, when expansion of the variable volume portion 130 is finished, the first control unit 171 may block the gas supplied from the gas storage 120 to the variable volume portion 130. Here, the controller 183 may control opening or closing of the first control unit 171.

The controller 183 may open the second control unit 172 in order to supply the gas in the variable volume portion 130 to the first moving flow path 161 to the third moving flow path 163. In detail, when the first sub control unit 172a is open, the gas is supplied from the variable volume portion 130 to the groove 111a of the body 111 along the first moving flow path 161 and may press the mover 141.

When the mover 141 collides with the gas, the mover 141 may move along the guide 150. Here, the guide protrusion 151 of the mover 141 may be moved along the guide recess 152 in the body 111.

In the above case, the controller 183 may operate the camera 142 to obtain a video or a photo of the outside. Here, the controller 183 may store the video or the photo obtained by the camera 142 or may transfer the video or the photo to the outside via the communicator 181.

When the mover 141 is moved due to the gas, the controller 183 may open the second sub control unit 172b after a predetermined time period passes. Here, the mover 141 may be located at a connecting portion between the second moving flow path 162 and the groove 111a.

The controller 183 may open the third sub control unit 172c when a predetermined time period passes after opening the second sub control unit 172b. In this case, the mover 141 may be moved from an end to the other end in the groove 111a of the body 111.

During the above operation, the controller 183 may control a third control unit 191 to be open. When the third control unit 191 is open, a discharge path 192 connected to the groove 111a may be open. In particular, the gas in the groove 111a may be discharged to outside via the discharge path 192. Also, the gas leaking from a gap between an inner wall of the groove 111a and the mover 141 may be discharged to outside via the discharge path 192. Here, since the gas in the variable volume portion 130 is slowly discharged to an outer portion of the variable volume portion 130, the volume of the variable volume portion 130 may decrease, and accordingly, the camera 142 may photograph external environment while being slowly lowered.

Therefore, the shell-type monitoring apparatus 100 may obtain data from various angles by allowing the body 111 to fly a predetermined time period. Also, the shell-type monitoring apparatus 100 is portable, and easy to use.

The shell-type monitoring apparatus 100 may rotate the photographing unit by using non-electric driving power and slowly lower to prevent generation of accident caused by rapid fall.

Figure 4:
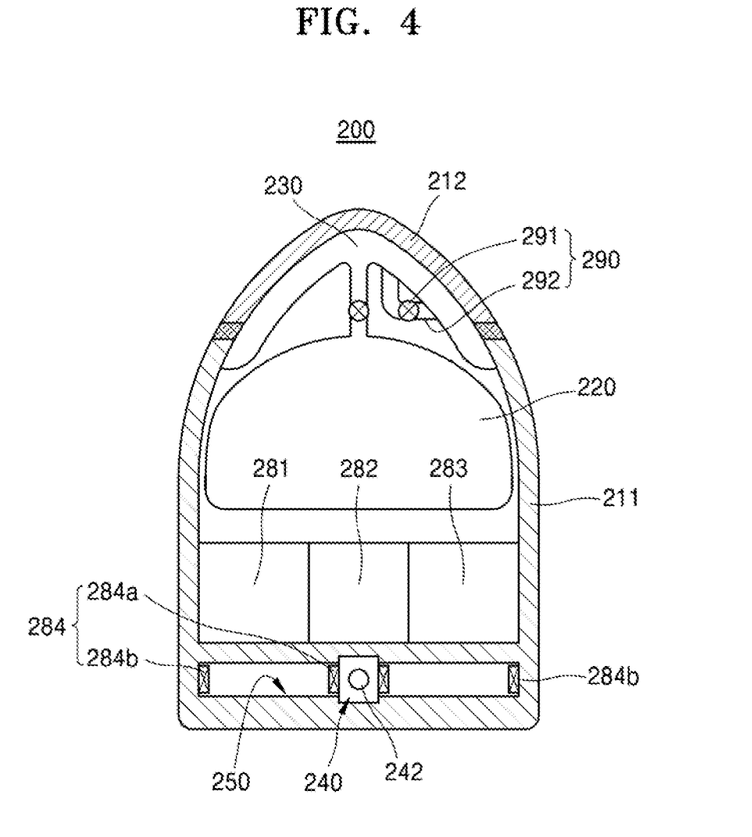
FIG. 4 is a conceptual diagram of a shell-type monitoring apparatus according to another embodiment of the present disclosure.
Figure 5:
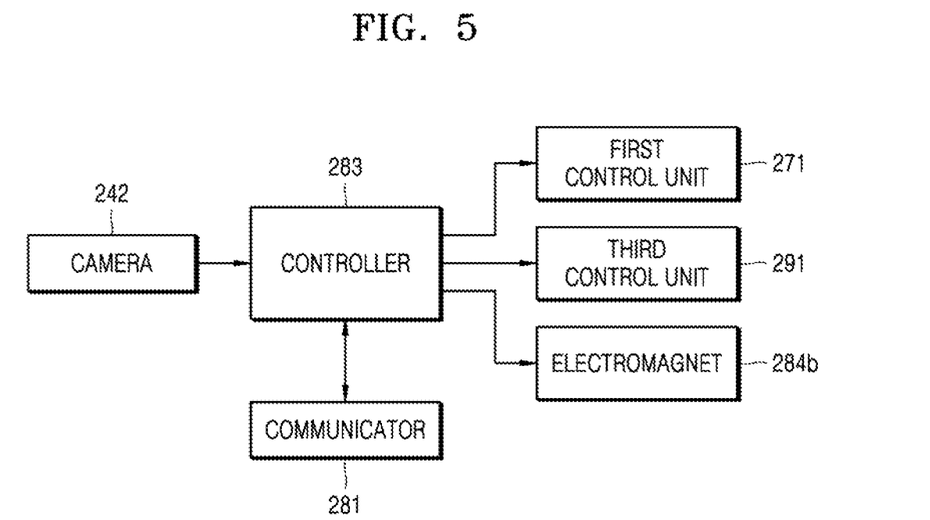
FIG. 5 is a block diagram illustrating a control flow of the shell-type monitoring apparatus of FIG. 4.

FIG. 4 is a conceptual diagram of a shell-type monitoring apparatus according to another embodiment of the present disclosure. FIG. 5 is a block diagram illustrating a control flow of the shell-type monitoring apparatus of FIG. 4.

Referring to FIGS. 4 and 5, a shell-type monitoring apparatus 200 may include a body 211, a cover 212, a gas storage 220, a variable volume portion 230, a photographing unit 240, a guide 250, a driver 284, a communicator 281, a first control unit 271, a power unit 282, a gas transfer unit 290, and a controller 283. Here, the body 211, the cover 212, the gas storage 220, the variable volume portion 230, the photographing unit 240, the guide 250, the communicator 281, the first control unit 271, the power unit 282, and the controller 283 are the same as or similar to those of the above described embodiment, and thus, detailed descriptions thereof are omitted here.

The driver 284 may be provided in various types. For example, the driver 284 may include a rack gear (not shown) provided on the photographing unit 240, and a motor (not shown) provided in the body 211 to be connected to the rack gear. As another embodiment, the driver 284 may include a magnet 284a and an electromagnet 284b facing each other. Here, the magnet 284a may be provided on one of the photographing unit 240 and the body 211, and the electromagnet 284b may be provided on the other of the photographing unit 240 and the body 211. As another embodiment, the driver 284 may include a cylinder (not shown) fixed on the body 211 and having a shaft connected to the photographing unit 240. Here, the driver 284 is not limited to the above examples, and may include any type of device and structure capable of moving the photographing unit 240. Hereinafter, for convenience of description, a case in which the driver 284 includes the magnet 284a and the electromagnet 284b, the magnet 284a is provided on the photographing unit 240, and the electromagnet 284b is provided on the body 211, will be described in detail below.

The gas transfer unit 290 may include a discharge path 292 connected to the variable volume portion 230 and a third control unit 291 provided on the discharge path 292. Here, the third control unit 291 may be formed as a valve, and may selectively open or close the discharge path 292 according to a signal from the controller 283.

In addition, according to the operation of the shell-type monitoring apparatus 200 as described above, in the shell-type monitoring apparatus 200 fired by a launcher, the first control unit 271 operates after a predetermined time period passes, and the gas may be transferred from the gas storage 220 to the variable volume portion 230.

When a predetermined time period passes after finishing expansion of the variable volume portion 230, the driver 284 operates to move the photographing unit 240. In detail, the electromagnet 284b may be electrically connected to the power unit 282. Here, a plurality of electromagnets 284b may be arranged being spaced from each other, and in particular, two of the plurality of electromagnets 284b may be arranged at opposite ends of a moving path of the photographing unit 240.

At least one of the plurality of electromagnets 284b may operate according to control of the controller 283. Here, attractive force or repulsive force is applied to the magnet 284a by the electromagnet 284b that operates from among the plurality of electromagnets 284b, and then, the mover 241 may be moved. Also, a camera 242 may be moved according to the movement of the mover 241.

During the above operation, the controller 283 may store data obtained by the photographing of the camera 242 or transfer the data to outside via the communicator 281.

Therefore, the shell-type monitoring apparatus 200 may obtain data from various angles by allowing the body 211 to fly a predetermined time period. Also, the shell-type monitoring apparatus 200 is portable, and easy to use.

While the present disclosure has been described based on the preferred embodiments above, the shell-type monitoring apparatus of the present disclosure is not necessarily limited to the embodiments described above, but may be implemented in a variety of modifications and variations without departing from the spirit and scope of the disclosure. Therefore, claims accompanied herein include the above modifications or variations.

INDUSTRIAL APPLICABILITY

According to embodiments of the present disclosure, a shell-type monitoring apparatus is fired to monitor an external environment or obtain a variety of information, and may be applied to military use, industrial use, climate investigation, etc.

The invention claimed is:

1. A shell-type monitoring apparatus comprising: a body; a gas storage provided in the body and configured to store a gas; a variable volume portion provided on the gas storage in the body, the variable volume portion having a volume that varies based on an amount of the gas supplied from the gas storage; a photographing unit provided in the body and configured to move in the body; and a moving flow path provided in the body and configured to supply the gas in the variable volume portion to the photographing unit to move a camera on the photographing unit.

2. The shell-type monitoring apparatus of claim 1, further comprising a guide provided in the body and configured to guide movement of the camera.

3. The shell-type monitoring apparatus of claim 2, further comprising a mover connected to the camera, provided on the guide and configured to move on the guide according to supply of the gas,
wherein the camera is configured to photograph an exterior of the shell-type monitoring apparatus.

4. The shell-type monitoring apparatus of claim 1, further comprising a communicator electrically connected to the camera and configured to transmit data that is photographed by the camera and converted, to an outer portion or to receive an external signal.

5. The shell-type monitoring apparatus of claim 1, further comprising a first controller configured to selectively block or allow supply of the gas from the gas storage to the variable volume portion.

6. The shell-type monitoring apparatus of claim 1, further comprising a second controller provided on the moving flow path and configured to selectively open or close the moving flow path.

7. The shell-type monitoring apparatus of claim 1, further comprising a power source electrically connected to the camera.

8. The shell-type monitoring apparatus of claim 1, further comprising a discharge path connected to the moving flow path and configured to guide the gas in the moving flow path to an outside.

9. The shell-type monitoring apparatus of claim 1, wherein the camera is configured to move along an outer surface of the body based on the gas supplied from the variable volume portion.

10. The shell-type monitoring apparatus of claim 8, further comprising a third controller provided on the discharge path and configured to selectively open or close the discharge path.

11. A shell-type monitoring apparatus comprising:
a shell body;
a camera provided on the shell body and configured to move along an outer surface of the shell body; and a driver provided on at least one of the shell body and the camera and configured to move the camera, the driver comprising:
- a magnet provided on one of the shell body and the camera; and
- an electromagnet provided on the other one of the shell body and the camera and facing the magnet.

12. The shell-type monitoring apparatus of claim 11, further comprising:
- a gas storage provided in the shell body and configured to store a gas; and
- a variable volume portion provided on the gas storage in the shell body, the variable volume portion having a volume that varies depending on an amount of the gas supplied from the gas storage.

13. The shell-type monitoring apparatus of claim 12, further comprising a gas transfer path provided in the shell body and connected to the variable volume portion, the gas transfer path configured to guide a gas in the variable volume portion to the outside.

14. The shell-type monitoring apparatus of claim 13, wherein the gas transfer path comprises a discharge path connected to the variable volume portion.

15. The shell-type monitoring apparatus of claim 14, wherein the gas transfer path further comprises a third control unit provided on the discharge path.

\* \* \* \* \*